United States Patent
Freeman

(10) Patent No.: US 9,376,733 B1
(45) Date of Patent: Jun. 28, 2016

(54) METHOD OF REMEDIATING ALUMINUM SMELTER WASTE

(71) Applicant: Walter B. Freeman, Cave Junction, OR (US)

(72) Inventor: Walter B. Freeman, Cave Junction, OR (US)

(*) Notice: Subject to any disclaimer, the term of this patent is extended or adjusted under 35 U.S.C. 154(b) by 469 days.

(21) Appl. No.: 14/035,887

(22) Filed: Sep. 24, 2013

Related U.S. Application Data

(60) Provisional application No. 61/706,061, filed on Sep. 26, 2012.

(51) Int. Cl.
| | |
|---|---|
| *C22B 7/04* | (2006.01) |
| *C22B 4/00* | (2006.01) |
| *C22C 1/02* | (2006.01) |
| *C04B 5/00* | (2006.01) |

(52) U.S. Cl.
CPC ... *C22B 7/04* (2013.01); *C04B 5/00* (2013.01); *C22B 4/00* (2013.01); *C22C 1/023* (2013.01)

(58) Field of Classification Search
CPC ............ C22B 7/04; C22B 4/00; C22C 1/023; C21C 5/54; C21C 5/36; C21C 7/076; C04B 5/00
See application file for complete search history.

(56) References Cited

U.S. PATENT DOCUMENTS

| | | | |
|---|---|---|---|
| 3,140,203 A | 7/1964 | Grunwald | |
| 3,323,900 A * | 6/1967 | Takahashi | B03B 9/00 209/13 |
| 2011/0081284 A1* | 4/2011 | Weaver | C22B 7/001 423/138 |

FOREIGN PATENT DOCUMENTS

| | | | |
|---|---|---|---|
| CN | 101734698 | | 6/2010 |
| JP | 62205210 A | * | 9/1987 |
| RU | 2299920 C1 | * | 5/2007 |
| WO | WO2013116290 | | 8/2013 |

OTHER PUBLICATIONS

RU 2299920 C1 published May 2007. Machine translation of the description.*

* cited by examiner

*Primary Examiner* — George Wyszomierski
*Assistant Examiner* — Tima M McGuthry Banks
(74) *Attorney, Agent, or Firm* — Jerry Haynes Law

(57) ABSTRACT

A method of producing a metal alloy utilizing aluminum smelter waste while simultaneously remediating the waste by converting the metallic and nonmetallic components to a non-hazardous slag. The method includes providing aluminum smelter, obtaining finely divided aluminum and/or spent pot liner from the aluminum smelter, and producing an alloy by oxidizing the finely divided aluminum and/or spent pot liner in the presence of nickelferous iron ore and heat. The non-hazardous slag is also produced during the process as a result of utilization of the nickelferous iron ore.

10 Claims, 3 Drawing Sheets

METHOD OF REMEDIATING ALUMINUM SMELTER WASTE

CROSS-REFERENCE TO RELATED APPLICATION

This application claims the benefit of U.S. provisional application No. 61/706,061, filed Sep. 26, 2012 and entitled Method for Treating Aluminum Smelter Waste, which provisional application is incorporated by reference herein in its entirety.

FIELD OF THE INVENTION

The disclosure generally relates to a method of remediating aluminum smelter waste to produce a nonhazardous, nontoxic slag, and an alloy metal by-product. More particularly, the disclosure relates to a method of remediating aluminum smelter waste by reacting aluminum dross and/or spent pot liner with an oxidizing agent, such as nickelferous iron ore, to produce a nonhazardous, nontoxic slag and an iron-nickel alloy as byproducts.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Often, aluminum smelting is the process of extracting aluminum from its oxide alumina, through an electrolytic process, such as the Hall-Héroult process. It is known that the Hall-Héroult process is the major industrial process for the production of elemental aluminum. This process involves dissolving alumina in molten cryolite, and electrolyzing the molten salt bath, typically in a purpose-built cell.

Typically, an oxidizing agent is the element or compound in an oxidation-reduction reaction that accepts an electron from another species. Because the oxidizing agent is gaining electrons, it is said to have been reduced. The oxidizing agent itself is reduced, as it is taking electrons onto itself, but the reactant is oxidized by having its electrons taken away by the oxidizing agent. Common oxidizing agents are known in the art, and include, oxygen, ozone, hydrogen peroxide, sulfuric acid, nitrate compounds, halogen compounds, hypochlorite, and hypohalite compounds. Another possible oxidizer may include nickelferous iron ore.

In many instances, an iron-nickel alloy is a group of alloys that mostly consist of the elements nickel and iron. There is an affinity between nickel (atomic number 28) and iron (atomic number 26). These elements also produce natural occurring alloys, a large number of commercial alloys, and provide a complex electron environment for catalyzing chemical reactions. Chromium is a chemical element which has the symbol Cr and atomic number 24. It is a steely-gray, lustrous, hard and brittle metal which takes a high polish, resists tarnishing, and has a high melting point. Chromium metal and ferrochromium alloys are commercially produced from chromite, by silicothermic or aluminothermic reactions, or by roasting and leaching processes.

Iron-nickel alloys may be produced by oxidizing aluminum and/or carbon in the presence of iron oxide or nickel oxide and heat. The process may use iron ore or other suitable compounds as an oxidizing agent. It has been found, however, that using nickelferous iron ore (NIO) as the oxidizing agent results in the production of iron/nickel alloys having higher quality and market value than alloys produced using an oxidizing agent which does not contain nickel or possible chromium.

It is known that environmental remediation deals with the removal of pollution or contaminants from environmental media such as soil, groundwater, sediment, or surface water for the general protection of human health and the environment. Remediation is generally subject to an array of regulatory requirements, and also can be based on assessments of human health and ecological risks where no legislated standards exist or where standards are advisory.

Accordingly, a method of remediating aluminum smelter waste by reacting aluminum dross and/or SPL with nickelferous iron ore (NIO) as an oxidizing agent to produce a nonhazardous, nontoxic slag, and a high-quality iron/nickel alloy by-products is needed.

SUMMARY OF THE INVENTION

The disclosure is generally directed to a method of remediating aluminum smelter waste to produce a high density, nontoxic slag, and a metal alloy byproduct. In one embodiment, the method may produce an alloy utilizing aluminum smelter waste while simultaneously remediating the smelter waste by converting the nonmetallic components to a nonhazardous slag. The aluminum smelter waste may include aluminum dross and/or spent pot liner (SPL), which are reacted with an oxidizing agent, such as nickelferous iron ore (NIO). The resultant byproduct comprises a high density alumina slag, and a nickel-iron alloy. An illustrative embodiment of the method includes providing aluminum smelter, obtaining aluminum powder and/or SPL from the aluminum smelter waste, and producing a byproduct metal alloy by oxidizing the aluminum powder and/or the carbon content of the SPL in the presence of NIO and heat. In some embodiments, however, the method may not utilize the SPL, whereby only the aluminum powder is oxidized to produce the metal alloy byproduct.

The treatment of the aluminum smelter waste includes a series of steps that convert the aluminum smelter waste and resultant byproducts into a desired physical state. The treatment may include, without limitation, separating elements from their natural ores through electrolysis, applying abrasion or commutation, filtering through a screen, optimizing relative quantities of reactants and products, mixing, agglomerating, oxidizing, reducing, and generating an exothermic reaction.

The present invention provides an efficient method for helping to convert a portion of the aluminum smelter waste into a beneficial metal alloy byproduct through the oxidizing agent, nickelferous iron. Those skilled in the art will recognize that the aluminum smelter waste is a byproduct of aluminum smelting. The aluminum smelter waste may be toxic, and includes, without limitation, aluminum dross; SPL, for which the anode effect results in emissions of carbon tetrafluoride and carbon hexafluoride; red mud containing oxides of alumina, silicon, iron, titanium, sodium, calcium, and other elements; emitted dust from dryers; contaminated water from dust suppression; nitrogen oxides, sulfur dioxide, sulfuric acid; and waste mud created by the extraction of alumina from its ore, bauxite, containing low levels of radioactive materials.

In one embodiment of the present invention, the aluminum smelter waste is an undesirable byproduct of the aluminum smelting process. The aluminum smelting process may include, without limitation, the Bayer process of refining bauxite to produce alumina, the Hall-Héroult process of extracting aluminum from its oxide alumina, displacing aluminum from its chloride with an active metal, and utilizing various anodes and cathodes for the smelting electrolysis. The primary purpose of the invention is to remove and/or neutralize the toxic constituents of the aluminum dross and the SPL; hence rendering these materials nontoxic and nonhazardous. This is accomplished by reacting such substances with the various elemental chemicals of the NIO and the fluxes.

The metal alloy byproduct may include, without limitation, iron-nickel alloy, nickel-iron alloy, austenite, elinvar, iron, nickel, and possibly chromium. The present invention utilizes stoichiometry to optimize the relative quantities of reactants, so that a desired nickel-iron proportion may be achieved. By reacting the aluminum smelter waste and the oxidizing agent in different proportions and conditions, an eclectic assortment of alloys with various uses may be produced. Those skilled in the art, in light of the present teachings, will recognize that by utilizing nickelferous iron ore as the primary oxidizing agent, the resultant byproduct of iron-nickel alloy has a much higher market value than alloy which is produced using an oxidizing agent that does not contain nickel or chromium.

In one embodiment of the present invention, the method of remediating aluminum smelter waste to produce a nonhazardous, nontoxic slag and a metal alloy byproduct may include an initial step of providing an aluminum smelter process. A next step may include forming a finely divided aluminum from an aluminum dross. The method may also include a step of providing the SPL. The SPL is not required for this method, whereby only the finely divided aluminum powder is oxidized. However, in some embodiments, the SPL is obtained, and commuted to an SPL powder of appropriate particle size, including, without limitation, ½". A compound mixture may then be formed by mixing the aluminum powder with the SPL powder.

Finally, the method may utilize the step of producing a metal alloy byproduct by oxidizing the aluminum powder and/or the carbon in the SPL in the presence of a nickelferous iron ore and heat. Producing the metal alloy byproduct comprises oxidizing the compound mixture in the presence of nickelferous iron ore and heat. In some embodiments, the oxidation process can occur in an electric arc furnace and/or an electric induction furnace.

A first aspect of the present invention provides a method of producing a nonhazardous, nontoxic slag and a metal alloy byproduct from aluminum smelter waste, comprising:

method of remediating an aluminum smelter waste for producing a nonhazardous, nontoxic slag and a metal alloy byproduct, the method comprising:
    obtaining the aluminum smelter waste through an aluminum smelter process;
    reacting the aluminum smelter waste with an oxidizing agent, the oxidizing agent comprising a nickelferous iron ore; and
    producing a nontoxic slag and a metal alloy byproduct, the slag comprising a high density alumina slag, the metal alloy byproduct comprising a nickel-iron alloy, and/or an iron-nickel alloy, and/or an austenite, and/or an elinvar, and/or an iron, and/or a nickel, and/or a chromium.

In a second aspect, the aluminum metal in the smelting process is produced by extraction from alumina ($Al_2O_3$) through an electrolysis process driven by electrical current. The process uses as electrolytes, a molten salt such as cryolite ($Na_3AlF_6$), capable of dissolve the alumina. Carbon anodes are immersed into the electrolyte carrying electrical current which then flows into the molten cryolite containing dissolved alumina. As a result, the chemical bond between aluminum and oxygen in the alumina is broken, the aluminum is deposited in the bottom of the cell, where a molten aluminum deposit is found, while the oxygen reacts with the carbon of the anodes producing carbon dioxide bubbles. The alumina reduction process is described as:

Reaction (1): $2Al_2O_3 + 3C \rightarrow 4Al + 3CO_2$.

In another aspect, a finely divided aluminum powder, derived from the aluminum dross; the carbon which forms part of the makeup of the SPL powder; and the nickelferous iron ore oxidizing agent are combined to form a compound mixture.

In another aspect, only the nickelferous iron ore is dried, preheated, and calcined prior to weighing and mixing with the smelter aluminum waste to finally form the compound mixture.

In another aspect of the present invention, the finely divided aluminum powder reacts with the iron and nickel oxides in the NIO as follows:

Reaction (2): $Fe_2O_3 + 2Al \rightarrow 2Fe + Al_2O_3$; and

Reaction (3): $3FeO + 2Al \rightarrow 3Fe + Al_2O_3$.

In another aspect of the invention, the carbon from the SPL reacts with the NIO in the compound mixture as follows:

Reaction (4): $Fe_2O_3 + 3C \rightarrow 2Fe + 3CO$; and

Reaction (5): $FeO + C \rightarrow Fe + CO$.

In yet another aspect, an electric arc furnace and/or an electric induction furnace is used for the oxidation process.

One advantage of the present invention is that using NIO as the primary oxidizing agent produces a resultant iron/nickel alloy that has a much higher market value than an alloy which is produced using an oxidizing agent that does not contain nickel or chromium.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
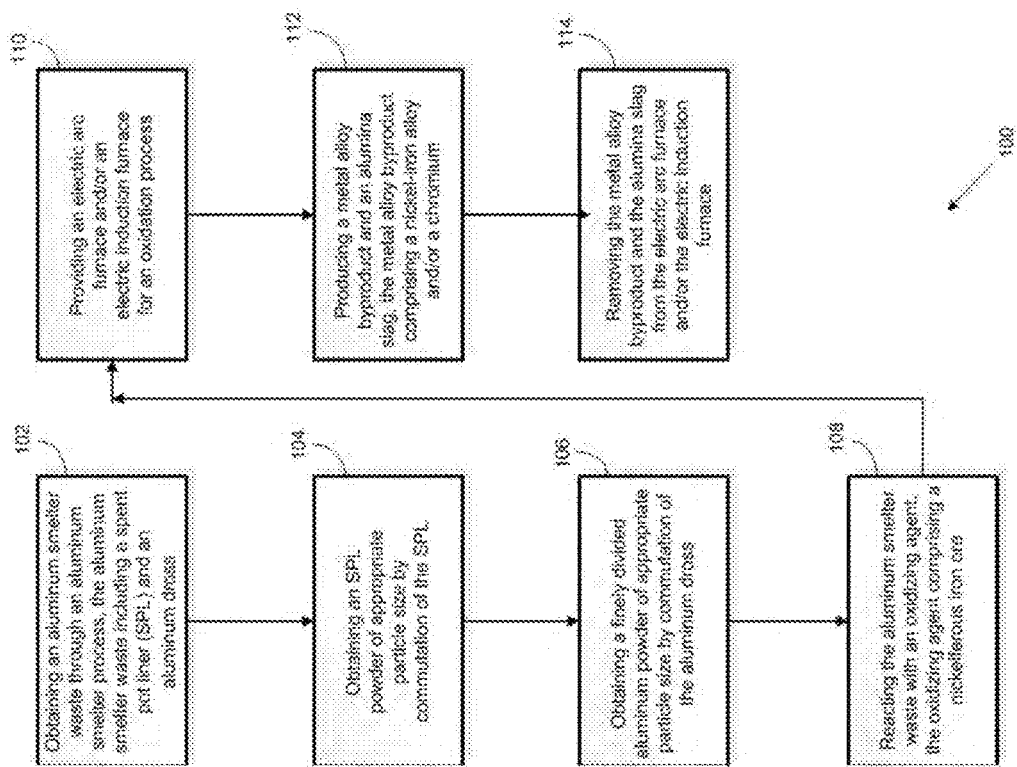
FIG. 1 illustrates a flowchart diagram of an exemplary method of remediating aluminum smelter waste, in accordance with an embodiment of the present invention.

Referring to FIG. 1 of the drawings, a flow diagram of a method 100 of remediating aluminum smelter waste is shown. In one embodiment, the method may produce a metal alloy utilizing aluminum smelter waste while simultaneously remediating the smelter waste by converting the nonmetallic components to a non-hazardous slag. The method 100 may produce a nonhazardous, nontoxic slag and a metal alloy byproduct from an aluminum smelter waste. An oxidizing agent of nickelferous iron ore (NIO) is used. Those skilled in the art will recognize that a primary benefit of using NIO as the primary oxidizing agent is that the resultant iron/nickel alloy has a much higher market value than alloy which is produced using an oxidizing agent that does not contain nickel or chromium.

In some embodiments, the method 100 may include an initial Step 102 of obtaining the aluminum smelter waste through an aluminum smelter process. The aluminum smelter waste includes a spent pot liner (SPL) and an aluminum dross. However, in some embodiments, the aluminum smelter waste may not utilize SPL, but rather, only the aluminum dross. The SPL and the aluminum dross are manipulated, often through commutation, to produce finely divided powders. A next Step 104 may include obtaining an SPL powder of appropriate particle size by commutation of the SPL. The commutation may include abrasion through a commutation device. The method 100 may further comprise a Step 106 of obtaining a finely divided aluminum powder of appropriate particle size by commutation of the aluminum dross. The commutation may include crushing and grinding the aluminum dross.

A Step 108 includes reacting the aluminum smelter waste with an oxidizing agent. The oxidizing agent comprises a nickelferous iron ore. The oxidation process requires a Step 110 of providing an electric arc furnace and/or an electric induction furnace. In this step, a high temperature is applied. A next Step 112 is producing a metal alloy byproduct and an alumina slag, the metal alloy byproduct comprising a nickel-iron alloy and/or a chromium. A final Step 114 comprises removing the a nonhazardous, nontoxic slag and the metal alloy byproduct from the electric arc furnace and/or the electric induction furnace. The nonhazardous, nontoxic slag may include, without limitation, a high density alumina slag.

Figure 2:
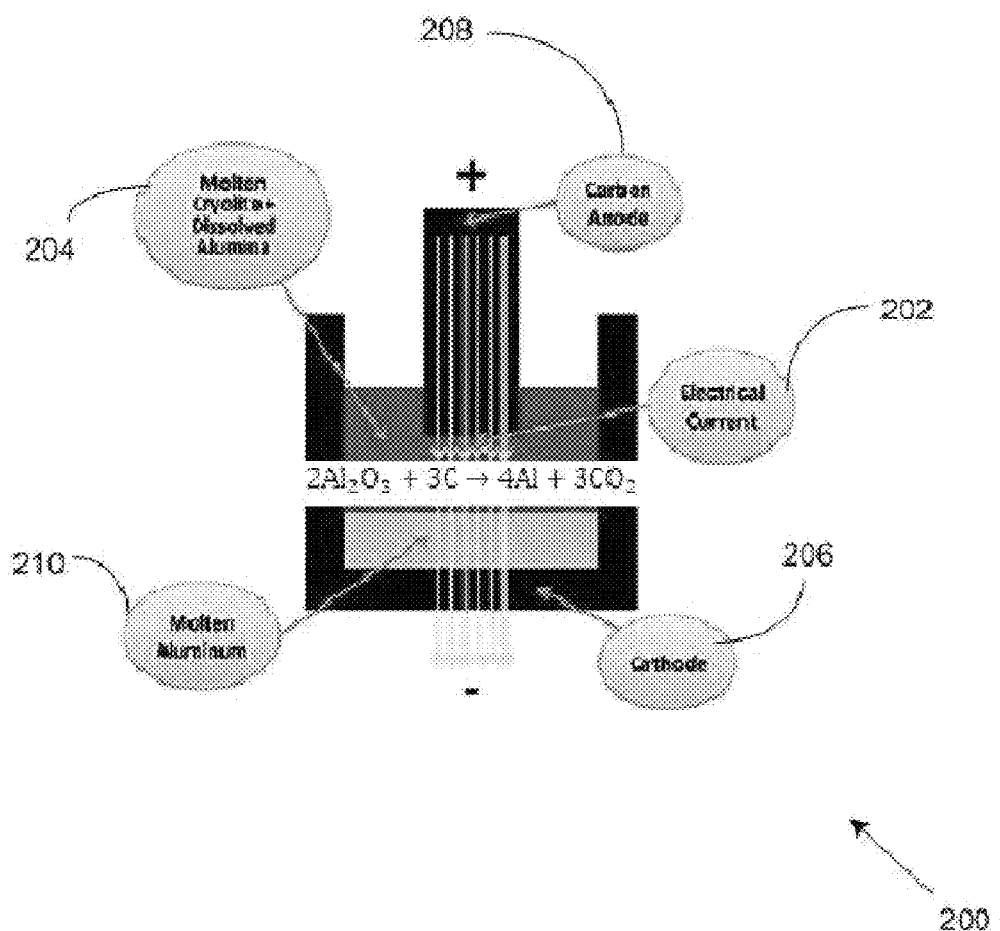
FIG. 2 illustrates a diagram of an exemplary aluminum smelter system, in accordance with an embodiment of the present invention.

Turning now to FIG. 2, an exemplary aluminum smelting system 200 is illustrated. The aluminum smelting system 200 produces aluminum metal through electrolysis 202. Initially, alumina is dissolved in molten cryolite 204 at about 1,832° Fahrenheit. The cryolite 204 comprises sodium aluminum fluoride. Those skilled in the art will recognize that the melting point of pure alumina is 3,729° degrees Fahrenheit, and that adding the cryolite 204 allows the electrolysis 202 to occur at a much lower temperature. In some embodiments, an electrolyte is placed in an iron vat 206 lined with graphite. The vat 206 serves as the cathode. The system 200 may then immerse carbon anodes 208 into the electrolyte to provide the positive terminal of the electrolysis reactions. A molten material forms in the vat 206. The system 200 then passes an electrical current through the molten material. At the vat 206, or cathode, the electrolysis 202 reduces aluminum ions to aluminum metal. At the carbon anode 208, carbon is oxidized to form carbon dioxide gas. The alumina reduction process is described in Reaction (1): $2Al_2O_3+3C \rightarrow 4Al+3CO_2$.

Finally, molten aluminum metal 210 sinks to the bottom of the vat and is drained periodically through a plug. The aluminum dross floats on the molten aluminum metal 210, forming chunks. These agglomerated chunks are processed to obtain a finely divided aluminum powder. The SPL eventually builds up on the vat 206 as a result of aluminum and inorganic metals embedding within the surface of the vat 206. It is this aluminum dross and SPL that is collected and oxidized with nickelferous iron ore to produce the desired metal alloy byproduct.

Figure 3:
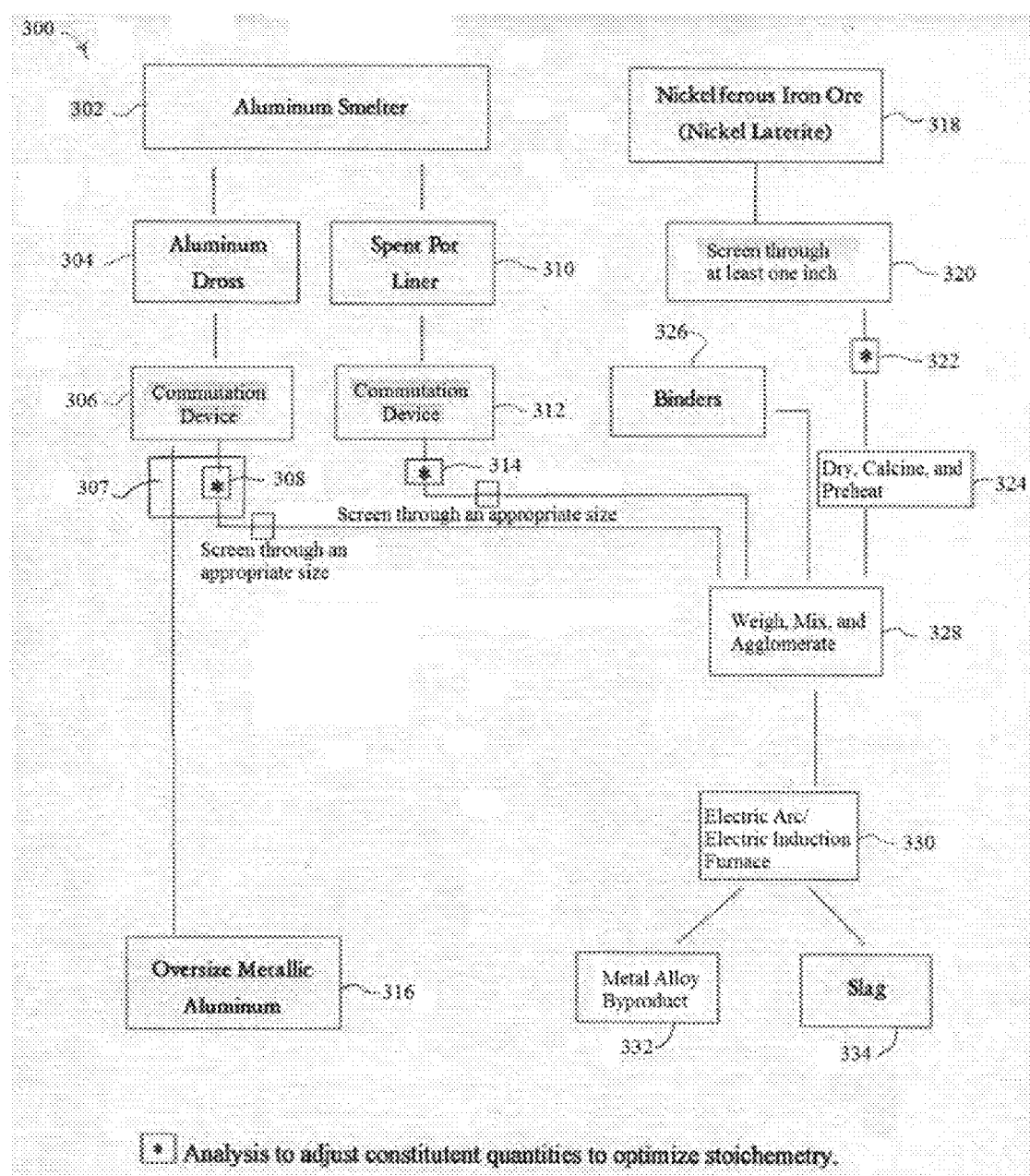
FIG. 3 illustrates a block diagram of an exemplary method of remediating aluminum smelter waste, in accordance with an embodiment of the present invention.

FIG. 3 is a block diagram 300 illustrating the remediation of aluminum smelt waste for producing a nonhazardous, nontoxic slag and an iron-nickel metal alloy byproduct. In block 302, aluminum smelter may be obtained. An electrolysis process, such as the Hall-Héroult process may be utilized. In block 304, aluminum dross may be obtained from the aluminum smelter. The aluminum dross comprises a mass of solid impurities, including excess alumina, which floats to the top of the molten aluminum. In block 306, the aluminum dross obtained in block 304 may be subjected to a milling or screening process such as by passing the aluminum dross through a commutation device and/or a vibrating or rotating screen, for example and without limitation. In one embodiment, the commutation process may grind the aluminum dross to produce commutated metallic aluminum and additional material, including aluminum oxide ($Al_2O_3$). The commuted dross will be passed through a screen 307 having a screen opening size that is appropriate to process requirements, including, without limitation, ½"-⅜" diameter. The aluminum powder that emerges from the screen comprises a finely divided aluminum powder. In block 308, the constituent quantities of the aluminum powder which is obtained from the commutation process in block 306 may be analyzed and adjusted to optimize stoichioemetry. In block 316, oversized metallic aluminum from the milling process in block 306 may be collected.

In block 310, SPL may additionally be obtained from a vat where the electrolysis process occurs. In some embodiments, however, the method may not utilize the SPL, whereby only the aluminum powder is oxidized to produce the metal alloy byproduct. In block 312, the SPL obtained in block 310 may be passed through the commutation device that commutes the SPL to a particle size appropriate for the process. In block 314, the constituent quantities of the commuted SPL which is obtained from the commutation process in block 312 may be analyzed and adjusted to optimize stoichioemetry.

In block 318, the NIO, or nickel laterite, may be obtained. NIO serves as the oxidizing agent for the present method. In block 320, the NIO which was obtained in block 318 may be subjected to a screening process by passing the NIO through a screen (not illustrated). The screen may have a diameter of at least 1". As a result of the screening process, NIO particles which are equal to or less than the size of the screen openings in the screen are obtained. In some embodiments, the screen openings in the screen through which the NIO is passed in block 320 may be about 1". In block 322, the constituent quantities of the NIO particles which are obtained from the screening process in block 320 may be analyzed and adjusted to optimize stoichioemetry. In block 324, the NIO obtained from block 322 is dried, calcined, and preheated. In this block, only the NIO is dried, calcined, and preheated.

In block 328, the stoichiometrically-optimized aluminum powder obtained in block 308, and the SPL powder obtained in block 314, and the NIO particles obtained in block 324 may be mixed and agglomerated to obtain a compound mixture. In block 326, binders may be added to the mixed and agglomerated compound mixture. In some embodiments, a lime, or hydrated calcium oxide, may be added as flux to lower the melt temperature in an electric arc furnace and/or an electric induction furnace, and to react with the fluorine to yield calcium fluoride. The calcium fluoride may then report to a high alumina slag, which is one of the final byproducts, along with the iron-nickel alloy, which results from the oxidation process.

In block 330, the aluminum in the compound mixture which was obtained in block 328 may be subjected to oxidation in an electric arc furnace and/or an electric induction furnace. Accordingly, the metallic aluminum reacts with the iron and nickel oxides in the NIO according to Reactions (1) and (2) below:

$$Fe_2O_3 + 2Al \rightarrow 2Fe + Al_2O_3 \qquad \text{Reaction (1)}$$

$$3FeO + 2Al \rightarrow 3Fe + Al_2O_3 \qquad \text{Reaction (2)}$$

The carbon which is contained in the SPL powder reacts with the NIO in the compound mixture according to Reactions (3) and (4) below:

$$Fe_2O_3 + 3C \rightarrow 2Fe + 3CO \qquad \text{Reaction (3)}$$

$$FeO + C \rightarrow Fe + CO \qquad \text{Reaction (4)}$$

The furnace off-gases may include CO, $CO_2$ and fluorine and may be treated in an industry-standard pollution control system (PCS) (not illustrated) which is known by those skilled in the art. The amount of fluoride contained in the off-gas will be minimized owing to the reaction of fluorine with lime contained in the mixture.

In block 332, the metal alloy byproduct which results from the oxidation process in block 330 may be removed from the electric arc furnace and/or the electric induction furnace. In block 334, the high alumina slag which results from the oxidation process in block 330 may be removed from the electric arc furnace and/or the electric induction furnace.

It will be appreciated by those skilled in the art that remediating aluminum smelter waste may result in the production of approximately 2 lbs. of iron/nickel alloy per pound of metallic aluminum obtained from the aluminum dross in block 304 and approximately 3 lbs. of iron/nickel alloy per pound of fixed carbon contained in the SPL powder obtained in block 312. The reaction of aluminum with iron oxide in the electric arc/electric induction furnace in block 330 is strongly exothermic and results in a reduction of power consumption in the electric arc/electric induction furnace per unit of alloy produced. Oxidation of 1 lb. of aluminum may yield approximately 5 kwh equivalent thermal energy. A primary benefit of using NIO as the primary oxidizing agent is that the resultant iron/nickel alloy has a much higher market value than alloy which is produced using an oxidizing agent that does not contain nickel or chromium.

While the illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A method of remediating an aluminum smelter waste for producing a nonhazardous, nontoxic slag and a metal alloy byproduct, the method comprising:

obtaining the aluminum smelter waste through an aluminum smelter process, wherein the aluminum smelter waste comprises a carbon, an inorganic material, and an aluminum powder;

reacting the aluminum smelter waste with an oxidizing agent, the oxidizing agent comprising a nickelferous iron ore; and producing a nontoxic slag and a metal alloy byproduct, the slag comprising a nonhazardous, nontoxic alumina slag, the metal alloy byproduct comprising a nickel-iron alloy.

2. The method of claim 1, wherein the carbon and the inorganic material are byproducts of a spent pot liner (SPL).

3. The method of claim 2, wherein the aluminum powder is a byproduct of processing an aluminum dross.

4. The method of claim 3, further comprising obtaining an SPL powder by crushing the SPL and obtaining a compound mixture by mixing the aluminum powder with the SPL powder, wherein producing the metal alloy byproduct comprises oxidizing the compound mixture in the presence of the nickelferous iron ore and heat.

5. The method of claim 4, wherein the step of reacting the carbon, the inorganic material, and the aluminum powder with an oxidizing agent further comprises applying heat.

6. The method of claim 5, wherein oxidizing the aluminum powder comprises providing an electric arc furnace and/or an electric induction furnace, and oxidizing the aluminum powder in the electric arc furnace and/or an electric induction furnace.

7. The method of claim 6, wherein the metal alloy byproduct further comprises an iron-nickel alloy, an austenite, an elinvar, an iron, a nickel, and/or a chromium.

8. A method of remediating an aluminum smelter waste for producing a nontoxic slag and a nickel-iron alloy byproduct and/or chromium alloy byproduct by utilizing a nickel/iron/chromium ore comprising:

providing an aluminum smelter process;

obtaining a finely divided aluminum contained in an aluminum dross from the aluminum smelter process;

producing a nontoxic slag and a metal alloy byproduct by oxidizing the aluminum powder in the presence of a nickelferous iron ore and heat; and providing spent pot liner (SPL), obtaining an SPL powder of appropriate particle size by commutation of the SPL, and obtaining a compound mixture by mixing the aluminum with the SPL powder, wherein producing the metal alloy byproduct comprises oxidizing the compound mixture in the presence of nickelferous iron ore and heat.

9. The method of claim 8, wherein oxidizing the finely divided aluminum comprises providing an electric arc furnace and/or an electric induction furnace.

10. A method of remediating an aluminum smelter waste for producing a nontoxic slag and a metal alloy byproduct, the method consisting of:

obtaining the aluminum smelter waste through an aluminum smelter process, the aluminum smelter waste comprising a spent pot liner and an aluminum dross;

obtaining an SPL powder of appropriate particle size by commutation of the spent pot liner;

obtaining a finely divided aluminum powder of appropriate particle size by commutation of the aluminum dross;

reacting the aluminum smelter waste with an oxidizing agent, the oxidizing agent comprising a nickelferous iron ore;

providing an electric arc furnace and/or an electric induction furnace for the oxidation process;

producing a metal alloy byproduct and an alumina slag, the slag comprising a nonhazardous, nontoxic alumina slag, the metal alloy byproduct comprising a nickel-iron alloy, and/or an austenite, and/or an elinvar, and/or an iron, and/or a nickel, and/or a chromium; and removing the nonhazardous, nontoxic slag and the metal alloy byproduct from the electric arc furnace and/or an electric induction furnace.

\* \* \* \* \*